United States Patent [19]
Brutsaert

[11] Patent Number: 5,673,739
[45] Date of Patent: Oct. 7, 1997

[54] ROLL-UP AWNING ASSEMBLY

[75] Inventor: Louis Marcel Brutsaert, Menen, Belgium

[73] Assignee: Brutsaert Accessories N.V., Belgium

[21] Appl. No.: 655,934

[22] Filed: May 31, 1996

[30] Foreign Application Priority Data

Jun. 2, 1995 [BE] Belgium ................... 09500486

[51] Int. Cl.$^6$ .................................................. E04F 10/06
[52] U.S. Cl. .................................................. 160/22; 160/66
[58] Field of Search .......................... 160/22, 23.1, 66, 160/67, 26, 29, 33, 38; 135/88.11, 88.12

[56] References Cited

U.S. PATENT DOCUMENTS

| | | | |
|---|---|---|---|
| 2,134,283 | 10/1938 | Jones . | |
| 3,722,571 | 3/1973 | Knight et al. | 135/88.11 X |
| 4,164,972 | 8/1979 | Bennett . | |
| 4,188,964 | 2/1980 | Greer | 135/88.12 X |
| 5,016,699 | 5/1991 | Akers et al. | 160/22 |
| 5,121,782 | 6/1992 | Renkhoff et al. | 160/22 |
| 5,192,111 | 3/1993 | Hanemaayer . | |
| 5,242,003 | 9/1993 | Pozzi | 160/22 |
| 5,285,837 | 2/1994 | Pozzi | 160/22 |
| 5,333,663 | 8/1994 | Eger | 160/22 |
| 5,427,168 | 6/1995 | Lohausen | 160/22 |

FOREIGN PATENT DOCUMENTS

| | | |
|---|---|---|
| 332.240 | 10/1903 | France . |
| 9312924 | 12/1993 | Germany . |

*Primary Examiner*—David M. Purol
*Attorney, Agent, or Firm*—Bacon & Thomas

[57] ABSTRACT

Roll-up awning which is intended to be installed in an opening (3) in a wall (1) and which includes an awning case (11) with an opening (12) which, in rolled-up position of the awning (2), is closed off by a front profile (13) which is attached to the front extremity of the awning cloth (14). The awning (2) mainly is formed by an actual awning case (31) which, at the top and at the place of the outer surface of the awning case (11), is provided with one part (20) of a hinge (20-8) which can cooperate with the second part (8) of this hinge (20-8) which is provided at the top of the aforementioned opening (3) and at the place of the outer wall of the aforementioned vertical wall (1).

13 Claims, 3 Drawing Sheets

ROLL-UP AWNING ASSEMBLY

BACKGROUND OF THE INVENTION

1. Field of the Invention

This invention refers to a roll-up awning assembly, more particularly to an awning which mainly consists of an awning assembly case with an opening which, in rolled-up position of the awning fabric, is closed by a front profile which is attached to the front extremity of the awning fabric.

2. Discussion of Related Art

The aforementioned awnings are generally known and are attached to the outer wall of a motor caravan (e.g., motor home or recreation vehicle) or caravan (i.e., trailer), or at the outer surface of a wall.

The aforementioned construction of such awnings assemblies has a number of disadvantages.

A first disadvantage is that the assembly in rolled-up position still protrudes from the plane of the vertical wall. As a result of this, a motor caravan or caravan with such built-up awning assembly will undergo more air resistance and, as a result of this, the fuel consumption will be higher.

A built-up awning assembly is also sensible for damage of the awning case and for dirt accumulation. Dirt, such as sand and dust, can penetrate easily into the awning case and block up the wind-up mechanism herein.

An additional disadvantage of a built-up awning case consists in that even in rolled-up position, the awning assembly often remains visible which influences the esthetic appearance of the wall in a very disadvantageous manner.

In order to exclude the aforementioned disadvantages, it has already been suggested to build such awning assemblies into the vertical wall with which it cooperates, in such a manner that, at that moment, the awning assembly in rolled-up position remains within the outer surface of the corresponding vertical wall.

To this aim, it is known to provide a space in this wall whereby in the back wall of this space suspending means are attached with which the awning case can cooperate in order to be hung and attached in this space.

The disadvantage of such built-in known awning assembly is, anyhow, that the height of the aforementioned space has to be larger than the height of the awning assembly to be built-in, because this awning assembly has to be inserted and afterwards to be moved downward in order to let the awning case cooperate with the aforementioned suspending means.

Hereby is obtained that, between the upper wall of the awning assembly and the upper wall of the space in which it is mounted, a space remains.

In order to cover this opening, it has already been suggested to attach an additional profile which partially moves in front of the awning case whereby this profile is suspended above the aforementioned space and hangs downward freely.

An additional disadvantage is to make the aforementioned space mainly watertight, which comprises additional work.

Thus, the present invention refers to a roll-up awning assembly which excludes the aforementioned and other disadvantages.

BRIEF SUMMARY OF THE DISCLOSURE

To this aim, the roll-up awning assembly according to the invention mainly consists of an opening in a vertical wall which can contain the complete awning in rolled-up position, whereby this awning assembly is mainly formed by an awning case which, at the top and at the place of the outer surface of the awning case, is provided with one part of a hinge which can cooperate with the second part of this hinge which is provided at the top of the aforementioned opening and at the intersection of the outer wall and the aforementioned vertical wall.

In a preferred form of embodiment, this hinge shall be formed in such a manner that the complete awning case can be attached, and respectively removed, without any mounting or dismounting, by means of a hinge of the lateral slide-in type, for example, a hinge of which the male part is brought into the female part of the hinge transversely or perpendicularly with respect to the lengthwise direction of the profile.

Thus, a very simple watertight mounting and dismounting of a complete awning assembly is achieved, whereby the height of the awning case can equal the height of the opening wherein it has to be attached, in such a way, that, with the awning fabric in rolled-up position, no openings are formed between the awning case and the aforementioned space.

The awning assembly according to the invention mainly consists of an awning case with an opening which, in rolled-up position of the awning fabric, is closed off by a front profile which is attached at the front extremity of the awning fabric, whereby the awning case is built into a vertical wall in such a way that, in rolled-up position, its outer surface substantially lies the same a plane as the outer surface of the aforementioned vertical wall and whereby the awning case and the front profile each consist of two separate profiles of which, respectively, one profile is visible at the outside of the awning case.

In this manner, an awning case according to the invention in rolled-up position is not or is only slightly exposed to dirt or for exterior damage, and the esthetic appearance of the vertical wall is almost not influenced in a disadvantageous way, whereby between the awning space and the awning case no openings are formed or are necessary and whereby, in the case of a motor caravan or caravan, such awning case does not form an air resistance and the visible part are simple to remove, such that only these parts need be processed, for example, in order to paint or lacquer them or the like.

BRIEF DESCRIPTION OF THE DRAWINGS

In order to better show the characteristics of the invention, several preferred embodiments of an awning according to the invention are described hereafter, by means of example without any limitative character, with reference to the accompanying drawings, wherein.

DETAILED DESCRIPTION OF PREFERRED EMBODIMENT

Figure 1:
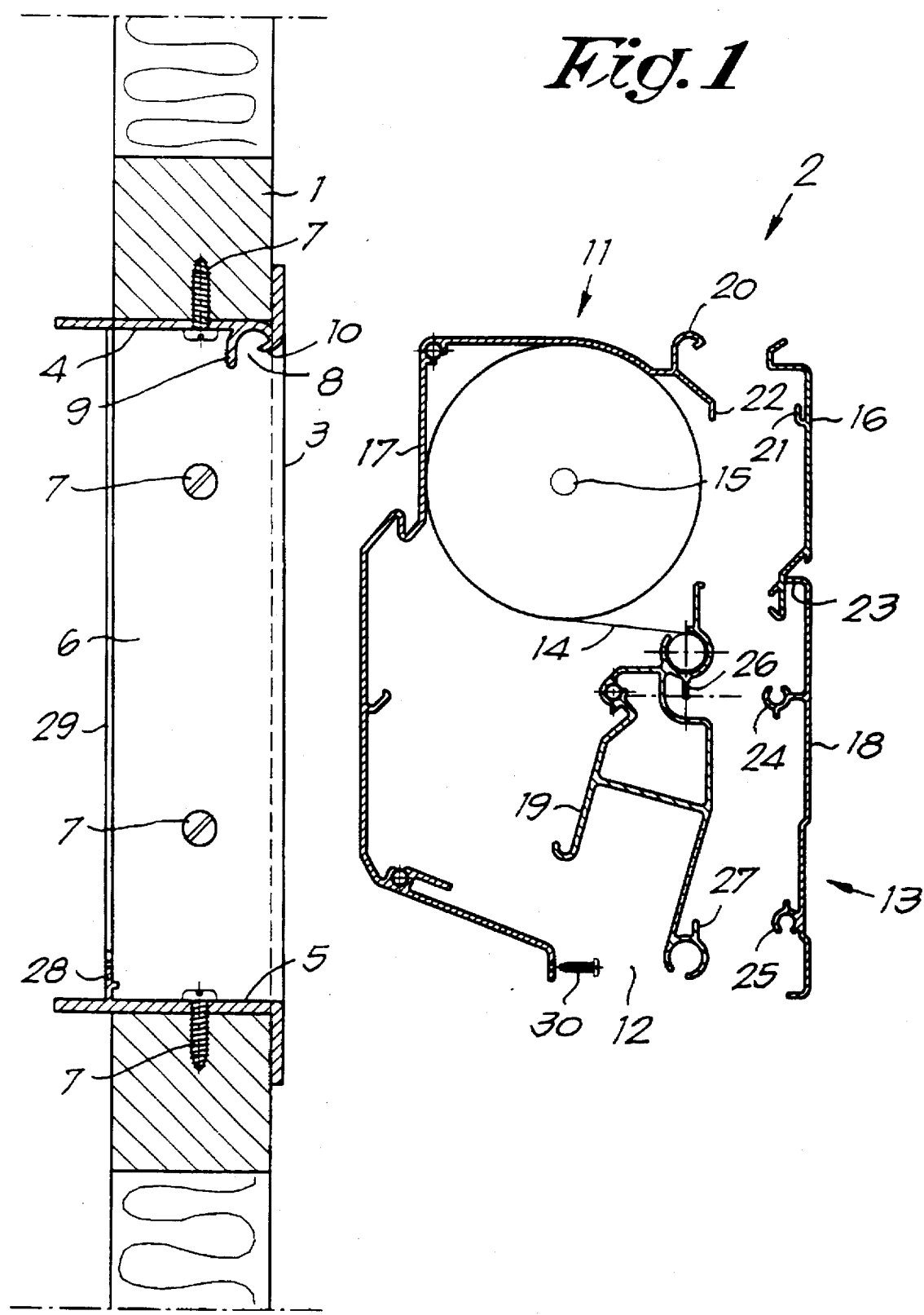
FIG. 1 in cross-section shows a vertical wall which is suitable for building-in a roll-up awning assembly, with the most important parts of the roll-up awning construction in the front area.

In the figures, a vertical wall 1 is shown which is suitable for building-in a roll-up awning case 2, whereby the wall 1 consists of the lateral wall of a caravan, camping car or similar (e.g., motor home, trailer, recreation vehicle). In another embodiment, the vertical wall can of course be formed by the outer wall of a house (e.g., building).

At a predetermined height and over a predetermined length, the aforementioned vertical wall 1 is provided with a horizontal rectangular opening 3 wherein the aforementioned awning case 2 can be installed.

In the opening 3, top and bottom frame sections 4-5 are attached between which, at the extremities, vertical or side profiles or frame sections 6 are provided. The attachment of the profiles or frame sections 4 to 6 is performed by means of screws 7 or by means of gluing (bonding).

The profile or frame section 4 is provided with a groove 8 which forms the female part of a hinge.

This groove 8 defines a semi-cylindrical form which is limited by a vertical lip portion 9 and which is partially closed off by an inward-directed lip portion 10.

As shown in the figures, the awning case 2 mainly consists of awning case portions 11 and 16 with an opening 12 which, in rolled-up position of the awning fabric 14, is closed off by a front profile 13 which is attached to the front extremity or free end of the awning fabric 14, whereby the awning fabric 14 is rolled up on a horizontal awning shaft 15 which is attached in the awning case 11.

More particularly the awning case portion 11 includes a profile 16 which, with closed awning, is visible from outside and a not visible inner profile 17. A separate front profile 13 includes profile 18 which, with closed awning, is always visible from outside, and a not visible innermost profile 19.

At one edge, the profile 17 of the awning case portion 11 defines a protruding part 20 which forms the male part of the aforementioned hinge and which can cooperate with the groove 8 of the profile 4.

The protruding part 20 which is profiled at the outside in order to cooperate with the groove 8 in the profile 4, is profiled at the inside in order to receive the profile 16 by means of lengthwise insertion.

Furthermore, at the inner wall of the profile 16, a groove 21 is provided with which the extremity 22 of the profile 17 can cooperate in a lengthwise slidable manner.

At its bottom, the profile 17 is provided with a profile in such a manner that, when the awning case is closed completely, the edge 23 of the profile 18 rests against the profile 16.

Furthermore, the profile 18, at its inner wall, comprises two hooks or notches, 24 and 25 respectively, with which, slidable in lengthwise direction, lips 26 and 27 of the profile 19 can cooperate.

The mounting of a roll-up awning case 2 in a vertical wall 1 is very simple and as follows.

After the profiles 4-5-6 are attached, the roll-up awning case 2 will be attached by inserting the protruding part 20 of the profile 17 in the groove 8 and hinging the awning case portion 11 together with the front profile 13 in the opening 3. The hinging or pivotal motion, it will be observed, takes place about a hinging axis that is generally parallel to shaft 15 (see FIG. 2).

Figure 2:
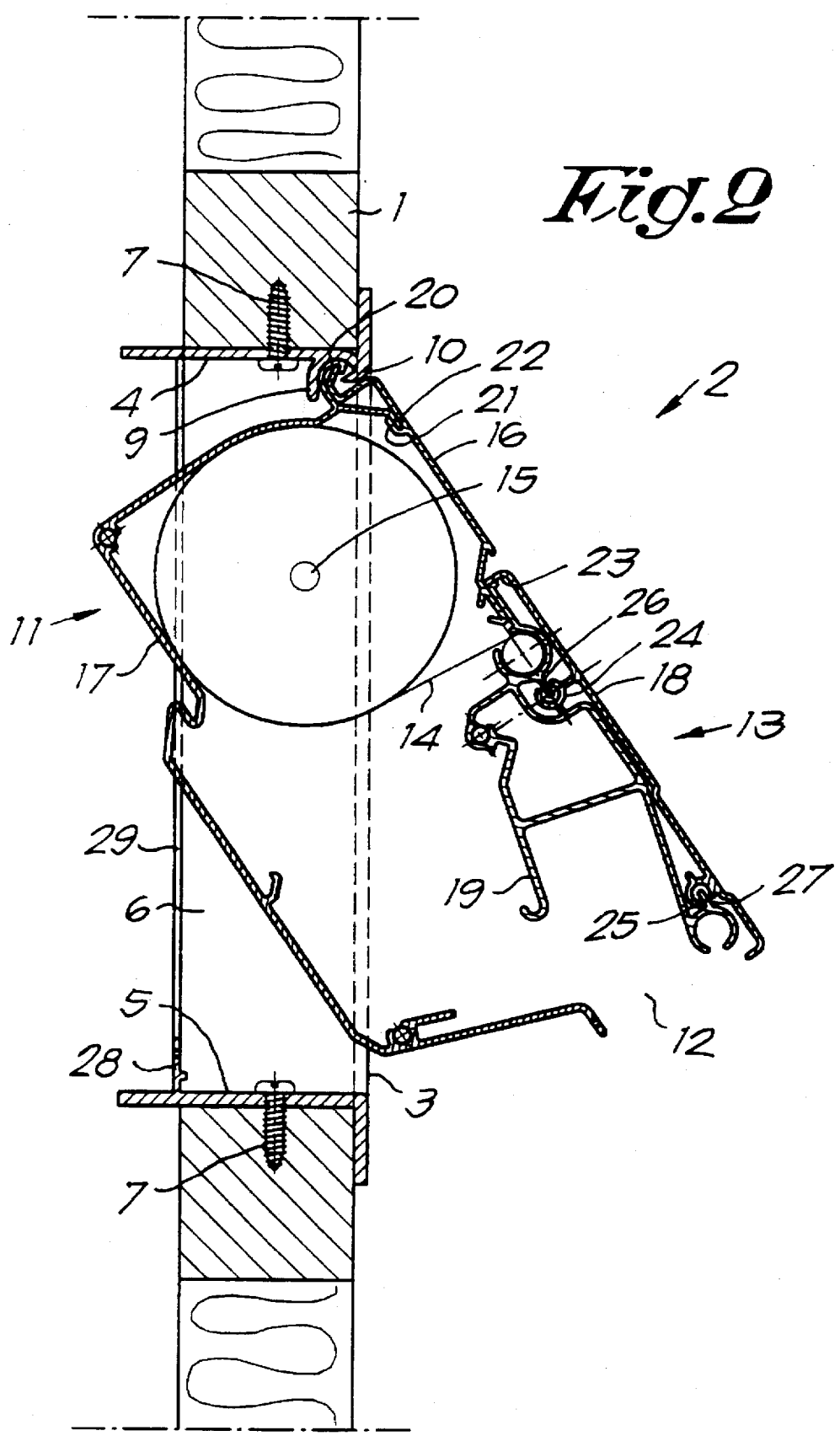
FIG. 2 shows a view similar to that of FIG. 1, but during the insertion of the awning construction.
Figure 3:
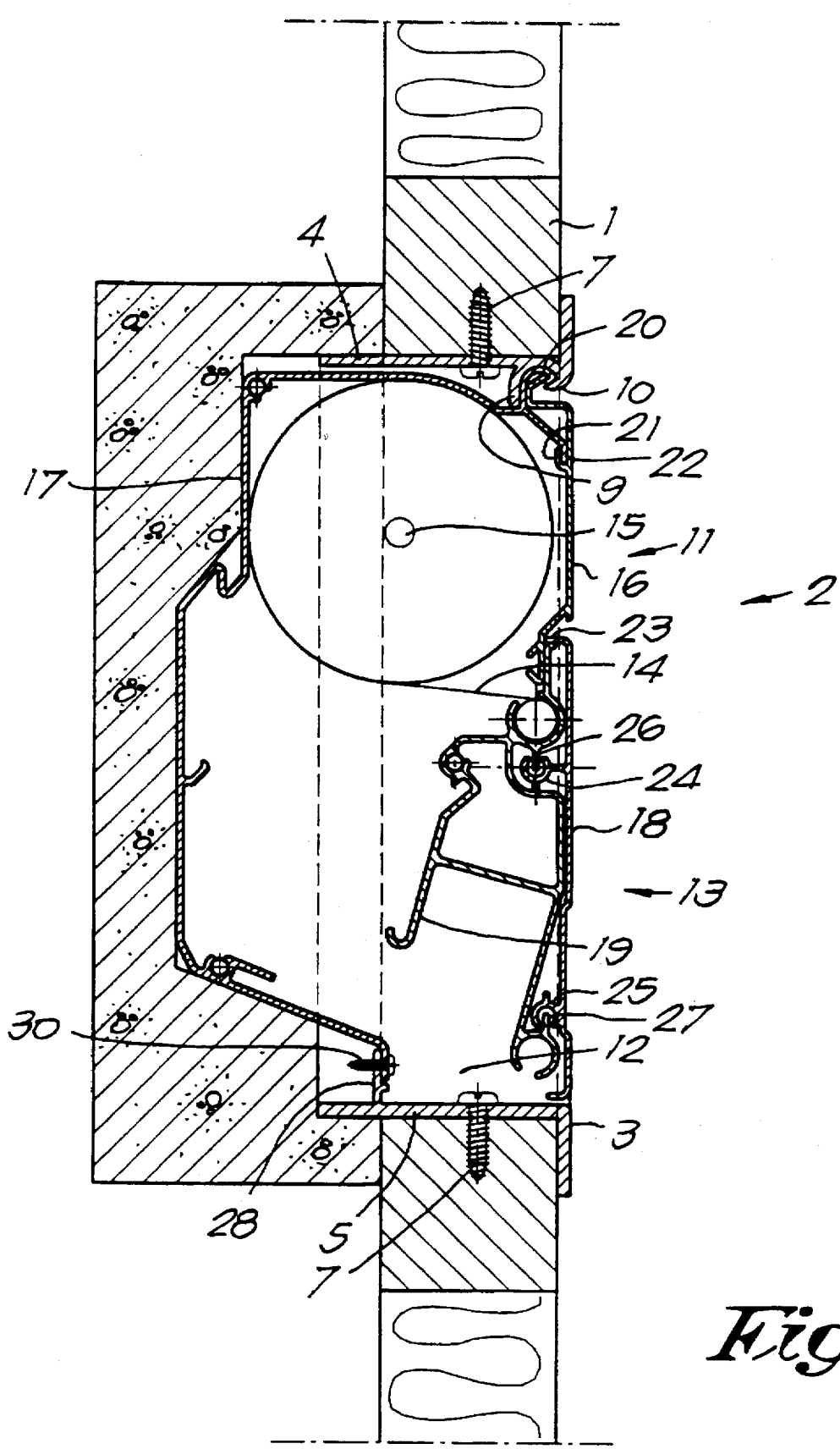
FIG. 3 shows a view similar to that of FIG. 2, but whereby the awning assembly is placed into the vertical wall.

Of course, the awning case portion 11 has been formed beforehand by sliding the profiles 16 and 17 into each other in lengthwise direction, whilst the front profile 13 is formed by sliding the profiles 18 and 19 into each other in lengthwise direction, after which all other elements, such as the shaft 15 with awning cloth 14 and such are mounted. As shown in FIG. 2, profile 13 carries profile 19 which in turn is attached to the awning front end above lip 26 so that profile 13 is drawn toward the case 11 by the awning on shaft 15.

After the awning case 2 is hinged into the opening 3, the screws 30 shall be attached in order to attach the awning case portion 11 fixedly with the profile 5, the profiles 6 respectively, whereby preferably between the case-engaging edge 28 of the profile 5 and between the similar edges 29 of the profiles 6 a sealing band, not shown in the drawings, is provided which, for example, is glued onto the edges 28-29, as a result of which a watertight construction is formed.

As, for which purposes whatsoever, the profiles 16 and/or 18 have to undergo another or a new processing, such as painting, lacquering, decorating or such, the profiles 16 and 17, 18 and 19 respectively, can easily be slid out of each other in order to slide them back, after processing them, as easily.

The invention is in no way limited to the forms of embodiment described above and represented in the figures, on the contrary can a roll-up awning construction according to the invention be realized in various forms and dimensions without leaving the scope of the invention.

What is claimed is:

1. A roll-up awning assembly adapted to be installed in an opening of a vertical wall having an outer surface lying in a plane: said opening defined in the wall and intersecting the outer surface of the wall; said assembly including an awning roll comprising a length of awning fabric rolled up on an awning shaft and having a free end, and a case enclosing the awning roll; said case comprising a first hinge member located at the top end of the case; a second hinge member adapted to be associated with the top area of the wall opening at the location where the opening intersects the wall in which the opening is defined; said first and second hinge members being configured to cooperate with each other as a hinge for enabling relative pivotal motion between the case and the second hinge member about an axis generally parallel to the awning shaft when the case and second hinge member are connected to each other with the hinge members disposed substantially in the plane of a wall defining an opening intended to receive the case; and a front profile connected to the free end of the awning fabric and closing the front of the case; said case installed in said opening with said front profile lying substantially in said plane, and said case including a rear profile located in the opening and not normally visible from the outer surface of the wall.

2. A roll-up awning assembly as claimed in claim 1, wherein said hinge members are configured as elongated male and female members shaped such that one hinge member is connectable to the other hinge member by laterally inserting the male member into the female member in mating relationship.

3. A roll-up awning assembly as claimed in claim 2, wherein the male hinge member is located on the awning case.

4. A roll-up awning assembly as claimed in claim 2, wherein the female hinge member is defined by a frame section adapted to be inserted in the top area of the opening of the wall.

5. A roll-up awning assembly as claimed in claim 4, wherein the female hinge member is further configured to include a longitudinally extending semi-cylindrical groove partially closed by a lip, and said male hinge member is configured to be received in the groove and to be retained therein by said lip upon relative rotation between said hinge members after the male and female hinge members are assembled together.

6. A roll-up awning assembly as claimed in claim 1, including top, bottom and side frame sections adapted to be fixedly mounted in said wall opening, and fastening means for fixedly mounting said frame sections in said wall opening.

7. A roll-up awning assembly as claimed in claim 1, said case including a second front profile including an inner side and a longitudinal groove on the inner side; said case including a longitudinally extending extremity; said groove and extremity configured so as to be assembled and connected to each other by longitudinally sliding one relative to the other.

8. A roll-up awning assembly as claimed in claim 6, said frame sections including case engaging surfaces, and said case including edge areas connectable by fasteners to said case engaging surfaces.

9. A roll-up awning assembly as claimed in claim 1, said front profile including an inner member to which said awning fabric free end is connected, said inner member including first elongate attaching features; and an outer member for closing the case, said outer member including second elongate attaching features; said first and second attaching features being configured to be assembled and connected to each other.

10. A roll-up awning assembly adapted to be installed in an opening of a vertical wall, said assembly including an awning roll comprising a length of awning fabric rolled up on an awning shaft and having a free end, and a case enclosing the awning roll; said case comprising a first hinge member located at the top end of the case; a second hinge member adapted to be associated with the top area of a wall opening at a location where the opening intersects a wall in which the opening is defined; said first and second hinge members being configured to cooperate with each other as a hinge for enabling relative pivotal motion between the case and the second hinge member about an axis generally parallel to the awning shaft when the case and second hinge member are connected to each other with the hinge members disposed substantially in the plane of a wall defining an opening intended to receive the case; and a front profile connected to the free end of the awning fabric and closing the front of the case; top, bottom and side frame sections adapted to be fixedly mounted in a wall opening, and fastening means for fixedly mounting said frame sections in a wall opening.

11. A roll-up awning assembly adapted to be installed in an opening of a vertical wall, said assembly including an awning roll comprising a length of awning fabric rolled up on an awning shaft and having a free end, and a case enclosing the awning roll; said case comprising a first hinge member located at the top end of the case; a second hinge member adapted to be associated with the top area of a wall opening at a location where the opening intersects a wall in which the opening is defined; said first and second hinge members being configured to cooperate with each other as a hinge for enabling relative pivotal motion between the case and the second hinge member about an axis generally parallel to the awning shaft when the case and second hinge member are connected to each other with the hinge members disposed substantially in the plane of a wall defining an opening intended to receive the case; and a front profile connected to the free end of the awning fabric and closing the front of the case; said case including a second front profile including an inner side and a longitudinal groove on the inner side; said case including a longitudinally extending extremity; said groove and extremity configured so as to be assembled and connected to each other by longitudinally sliding one relative to the other.

12. A roll-up awning assembly adapted to be installed in an opening of a vertical wall, said assembly including an awning roll comprising a length of awning fabric rolled up on an awning shaft and having a free end, and a case enclosing the awning roll; said case comprising a first hinge member located at the top end of the case; a second hinge member adapted to be associated with the top area of a wall opening at a location where the opening intersects a wall in which the opening is defined; said first and second hinge members being configured to cooperate with each other as a hinge for enabling relative pivotal motion between the case and the second hinge member about an axis generally parallel to the awning shaft when the case and second hinge member are connected to each other with the hinge members disposed substantially in the plane of a wall defining an opening intended to receive the case; and a front profile connected to the free end of the awning fabric and closing the front of the case; said front profile including an inner member to which said awning fabric free end is connected, said inner member including first elongate attaching features; and an outer member for closing the case, said outer member including second elongate attaching features; said first and second attaching features being configured to be assembled and connected to each other.

13. A roll-up awning assembly adapted to be installed in an opening of a vertical wall, said assembly including an awning roll comprising a length of awning fabric rolled up on an awning shaft and having a free end, and a case enclosing the awning roll; said case comprising a first hinge member located at the top end of the case; a second hinge member adapted to be associated with the top area of a wall opening at a location where the opening intersects a wall in which the opening is defined; said first and second hinge members being configured to cooperate with each other as a hinge for enabling relative pivotal motion between the case and the second hinge member about an axis generally parallel to the awning shaft when the case and second hinge member are connected to each other with the hinge members disposed substantially in the plane of a wall defining an opening intended to receive the case; and a front profile connected to the free end of the awning fabric and closing the front of the case; top, bottom and side frame sections adapted to be fixedly mounted in a wall opening; said second hinge member being associated with said top frame section.

* * * * *